R. CRAIG & M. J. & G. A. POLLEY.
TRANSMISSION MECHANISM FOR TRACTORS.
APPLICATION FILED FEB. 24, 1913. RENEWED APR. 5, 1918.

1,284,606.

Patented Nov. 12, 1918.
2 SHEETS—SHEET 1.

Witnesses:
Robert F. Brache
Leslie W. Fricke

Inventors
Robert Craig
Manford J. Polley
George A. Polley
By Brown, Williams, Bell, Hanson & Boettcher
Attorneys R. CRAIG & M. J. & G. A. POLLEY.
TRANSMISSION MECHANISM FOR TRACTORS.
APPLICATION FILED FEB. 24, 1913. RENEWED APR. 5, 1918.

1,284,606.

Patented Nov. 12, 1918.
2 SHEETS—SHEET 2.

Witnesses:
Robert F. Bracke
Leslie W. Fricke

Inventors
Robert Craig
Manford J. Polley
George A. Polley
By Brown, Williams, Bell, Hanson & Boettcher
Attorneys

UNITED STATES PATENT OFFICE.

ROBERT CRAIG, OF ROBINSDALE, AND MANFORD J. POLLEY AND GEORGE A. POLLEY, OF WINONA, MINNESOTA.

TRANSMISSION MECHANISM FOR TRACTORS.

1,284,606. Specification of Letters Patent. Patented Nov. 12, 1918.

Application filed February 24, 1913, Serial No. 750,129. Renewed April 5, 1918. Serial No. 226,965.

*To all whom it may concern:*

Be it known that we, ROBERT CRAIG, MANFORD J. POLLEY, and GEORGE A. POLLEY, citizens of the United States, residing, respectively, at Robinsdale, in the county of Hennepin, and State of Minnesota, Winona, in the county of Winona and State of Minnesota, and Winona, in the county of Winona and State of Minnesota, have invented a certain new and useful Improvement in Transmission Mechanism for Tractors, of which the following is a full, clear, concise, and exact description, reference being had to the accompanying drawings, forming a part of this specification.

The tractor transmission mechanism of our invention is provided with an improved driving gear arrangement and devices whereby two speeds may be had whether the tractor is moving forward or backward. Mechanism is also provided for readily throwing a power pulley into or out of driving relation with the power plant, as desired.

These and other features of our improved tractor transmission mechanism are described at length in the following description and are illustrated in the accompanying drawings, in which.

Similar characters of reference refer to similar parts throughout the several views.

Figure 1:
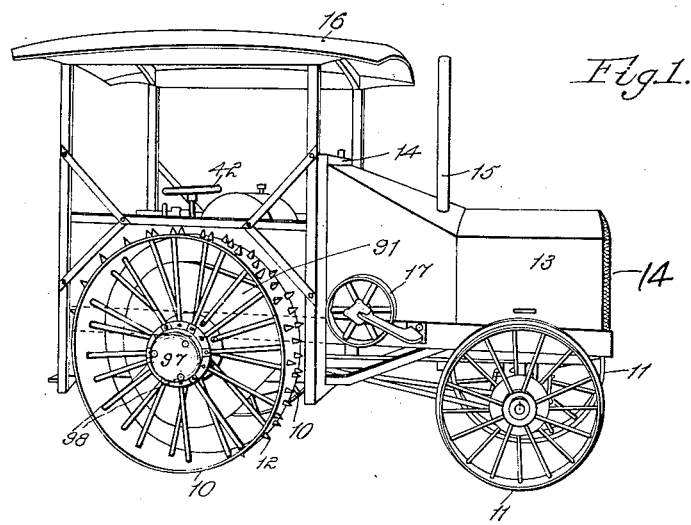
Figure 1 is a perspective view of our improved tractor complete.

Referring to Fig. 1, the tractor there illustrated is provided with a pair of rear driving wheels 10, and a pair of front wheels 11. The wheels 10 are preferably equipped with a plurality of spikes 12, or cleats as shown. These spikes or cleats may or may not be removable, as desired. Within the hood illustrated at 13, is located the power plant, comprising an internal combustion engine equipped with a cooling radiator illustrated at 14. The engine exhausts through the pipe 15, which preferably leads to a point as high or higher than the canopy 16, under which the operating levers, etc., are located. A pulley shown at 17, is adapted to be operatively connected with the tractor power plant when the same is to be used.

Figure 2:
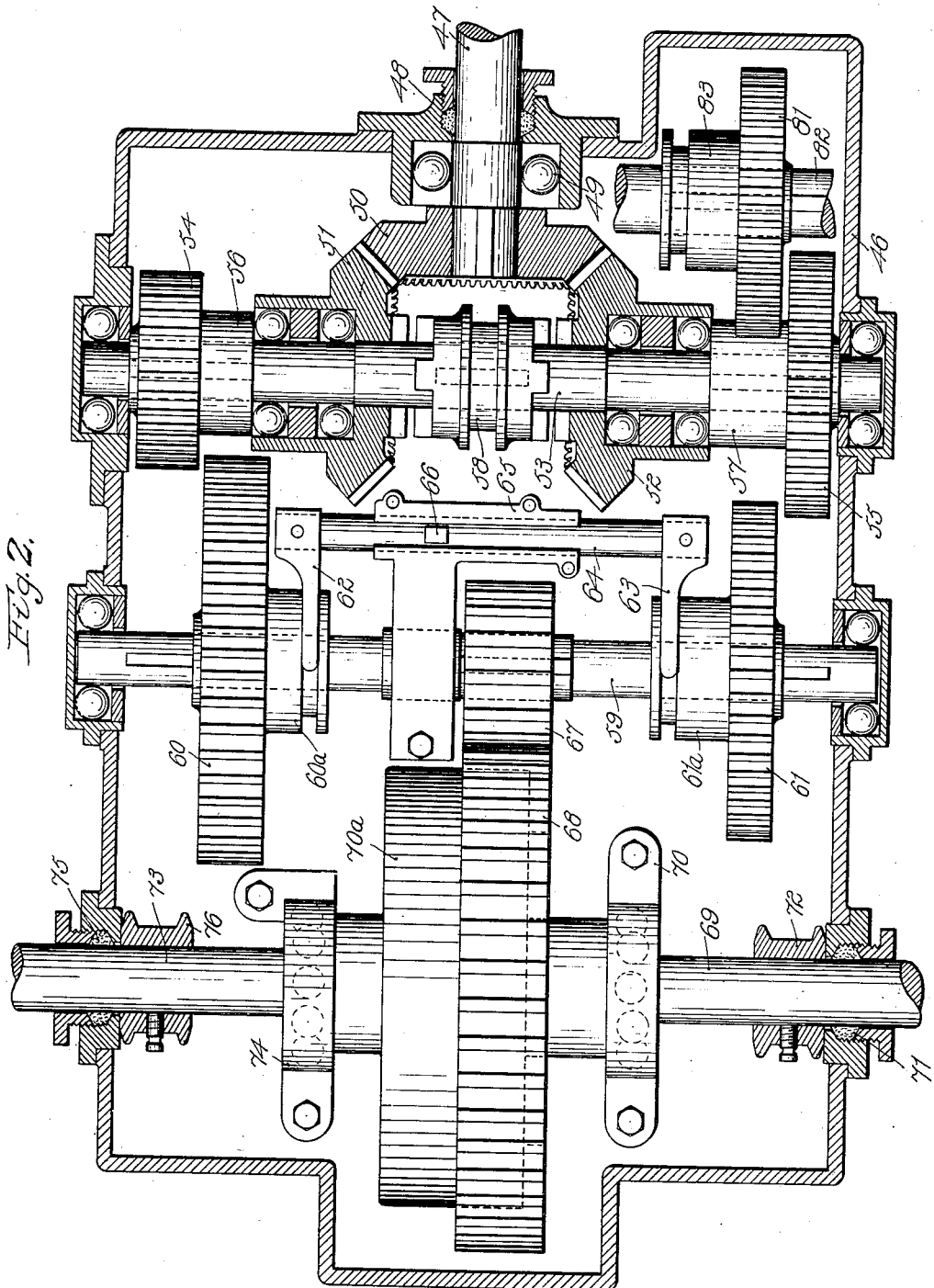
Fig. 2 is a horizontal sectional view of the transmission gear case.

The power from the tractor engine is transmitted through a friction clutch, not shown, to gearing within a gear case 46 and thence to the tractor driving wheels. The case and gearing are clearly shown in Fig. 2. A shaft 47, which is operatively connected with the engine, enters the front of the gear case through a stuffing box 48, and is provided with suitable ball bearings 49. Keyed to the inner end of the shaft 47 is a beveled or mitered gear 50, as shown.

This gear 50 normally meshes with a pair of beveled or mitered gears 51 and 52, loosely mounted upon a shaft 53, extending transversely of the gear case. This shaft 53 has ball-bearings in the walls of the gear case, and the gears 51 and 52 are preferably provided with ball-bearings, as shown.

Keyed upon or otherwise secured to the shaft 53, one near each end thereof, are spur gears 54 and 55, the gear 55 being of greater diameter than the gear 54. Hubs or spacing collars 56 and 57 separate the gears mounted upon the shaft 53. Each of the beveled gears 51 and 52, is provided on its inner end with a plurality of square teeth, which are adapted to be engaged by the teeth of a clutch 58, which is movable longitudinally of the shaft 53, but is keyed against rotation independently of the shaft. Suitable means is provided for shifting the clutch 58 into or out of engagement with either one of the gears 51 and 52.

Bearing in the casing 46, and disposed parallel to the shaft 53, is a shaft 59, also provided with ball-bearings, as shown. Shiftable longitudinally of the shaft 59, are gears 60 and 61. These gears are keyed against rotation independently of the shaft 59. Clutch forks 62 and 63 engaging in annular grooves in hubs 60$^a$ and 61$^a$, of the gears 60 and 61, retain the gears in the same position relatively to each other at all times and facilitate shifting of the gears. These forks are secured to a shaft 64 bearing in a bracket 65, as shown. The arm 66, with which the shaft 64 is provided, leads to a suitable lever and so afford means whereby the gears 60 and 61 may be shifted relatively to their shaft, as desired. By shifting the shaft 64 to the left, the gear 60 may be brought into mesh with the gear 54, and by shifting the shaft 64 in the opposite direction, the gear 61 may be brought into mesh with the gear 55. Owing to the gear ratios, it will be readily seen that with the shaft 53 turning at any speed, the shaft 59 will be rotated at a higher speed if the gear 61 is in mesh with the gear 55, than if the gear 60 is in mesh with the gear 54.

Keyed upon the shaft 59 at approximately the center thereof, is a small spur gear 67, normally in mesh with a relatively larger spur gear 68, which gear 68 is rigidly secured to the differential gear case 70ª. A shaft 69 bears in the wall of the casing 46 and the bracket 70, and is provided with a stuffing box 71, at the point where it passes through the wall of the gear case. A collar 72 is rigidly secured upon the shaft 69 and prevents longitudinal movement of the shaft 69 relatively to its bearings. Disposed in the same plane as the shaft 69, and disposed directly opposite the same, is a shaft 73, which bears in the gear case wall, and a bracket 74. This shaft is provided with a suitable stuffing box 75 and collar 76, as shown, the purpose of both of which is perfectly apparent and need not here be explained. This shaft 73 has driven relation to differential gearing within the casing 70ª. The construction of standard differential gearing is well known to all those skilled in the tractor or allied arts, and need not be here explained in detail. It may be said, however, that if either one of the shafts 69 or 73 should temporarily be held against rotation, the other shaft would have its speed of rotation correspondingly increased, due to the differential gearing mentioned. The shafts 69 and 73 extend through the gear case and are there provided with small spur gears 77. Each of these spur gears 77, engages a relatively larger gear 78, which is riveted or bolted to the inner flange 79, of one of the driving wheel hubs 80. The specific construction of the rear drive gear case will hereinafter be explained in detail. The operation of the gearing which has just been described, is as follows:

If it is desired that the tractor move in a forward direction, the clutch 58 is thrown into engagement with the clutch teeth of one of the beveled gears 51 or 52, according to the direction of rotation of the motor. As previously explained, the gear 51 is normally in driven relation with the gear 50. Owing to the fact that the clutch 58 is keyed upon its shaft, the said shaft is turned, thereby rotating the gears 54 and 55, keyed thereto. If the tractor is to move ahead at high speed, the shaft 64 is shifted to the right, thereby throwing the gear 61 into mesh with gear 55. If on the other hand, the tractor is to proceed at low speed, the gear 60 is moved into mesh with the gear 54. In practice, the clutch 58 is out of engagement with each of the beveled gears 51 and 52, when any shifting of the gears 60 or 61 takes place in order to do away with any possibility of stripping the transmission gearing.

If the tractor is to be driven backward, the speed at which it is to be driven is determined by the adjustment of the gears 60 and 61, and the clutch 58 is moved to the right into engagement with the beveled gear 52.

Located near the top of the right hand side of the front of the gear case, is a gear 81, which is mounted upon a shaft 82. This shaft extends through the gear case and is there provided with a power pulley 17, which is securely keyed thereto, as illustrated in Fig. 1. The gear 81 is shiftable longitudinally of the shaft 82, but is keyed against rotation independently of the shaft. When the power pulley is to be utilized, the gear 81 is shifted into mesh with the gear 55 and the clutch 58 is moved into engagement with either one of the gears 51 or 52 according to whether the power pulley is to be rotated in a clockwise or counter-clockwise direction. As clearly shown in Fig. 2, the gear 81 is provided with a grooved hub 83 to facilitate its shifting.

The gear case is made oil tight in order that the gears therein may run in oil, as in many gear cases heretofore used.

What we claim and desire to secure by Letters Patent of the United States is:

1. Transmission mechanism consisting of an engine driven shaft, a second shaft, a pair of gears loosely mounted upon said second shaft driven in opposite directions from said engine driven shaft, means for selectively bringing said loosely mounted gears into driving relation to the shaft upon which they are mounted, a third shaft, a pair of gears rigidly mounted upon said second shaft, a corresponding pair of gears on said third shaft adapted to mesh therewith, means for selectively bringing said third shaft gears into mesh with their corresponding second shaft gears, a power pulley, a driving gear therefor, and means for bringing said driving gear into mesh with one of the rigidly mounted gears of the second shaft.

2. Transmission mechanism comprising an engine driven bevel gear, a shaft disposed at right angles to the axis of the gear, a pair of bevel gears loosely mounted on said shaft and meshing with said engine driven gear, a clutch for connecting either one of said loosely mounted gears with the shaft upon which they are mounted, a pair of different sized gears rigidly mounted upon said shaft, a second shaft disposed parallel to the first shaft, a pair of gears arranged to mesh with the rigidly mounted gears of the first shaft mounted upon the second shaft and arranged to have longitudinal but not angular movement relative thereto, means for causing simultaneous shifting of both gears, said gears being positioned relative to the rigidly mounted pair of gears of the first shaft, so that when two co-acting gears are in mesh the other two are out of mesh, a third gear carried by the second shaft and positioned between the pair of gears also carried thereby, and differential mechanism operated from said last mentioned gear.

In witness whereof we hereunto subscribe our names in the presence of two witnesses.

ROBERT CRAIG.
MANFORD J. POLLEY.
GEORGE A. POLLEY.

Witnesses to the signature of Robert Craig:
R. S. VAN BERGEN,
C. W. YUST.

Witnesses to the signatures of Manford J. Polley and George A. Polley:
A. G. McCALEB,
ROBERT F. BRACKE.